US012737249B2

(12) United States Patent
Gowri et al.

(10) Patent No.: US 12,737,249 B2
(45) Date of Patent: Sep. 15, 2026

(54) MACHINE LEARNING ASSISTED REMEDIATION OF NETWORKED COMPUTING FAILURE PATTERNS

(71) Applicant: International Business Machines Corporation, Armonk, NY (US)

(72) Inventors: Shyamala Gowri, Bangalore (IN); Deepashree Gandhi, Bengaluru (IN); Mrudula Madiraju, Bangalore Urban (IN); Rakhi S Arora, Bangalore (IN); Jaya H Gabhane, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 17/648,576

(22) Filed: Jan. 21, 2022

(65) Prior Publication Data

US 2023/0236923 A1 Jul. 27, 2023

(51) Int. Cl.
*G06F 11/00* (2006.01)
*G06F 11/07* (2006.01)
*G06N 20/00* (2019.01)

(52) U.S. Cl.
CPC ...... *G06F 11/0793* (2013.01); *G06F 11/0709* (2013.01); *G06N 20/00* (2019.01)

(58) Field of Classification Search
CPC ............ G06F 11/0793; G06F 11/0709; G06F 11/3006
See application file for complete search history.

(56) References Cited

U.S. PATENT DOCUMENTS 7,721,152 B1 5/2010 Joshi
10,303,538 B2 5/2019 Thomas
(Continued)

FOREIGN PATENT DOCUMENTS

CN 103366312 A 10/2013
CN 104125286 A 10/2014
WO 2023/138594 A1 7/2023

OTHER PUBLICATIONS

International Search Report and Written Opinion, International Application No. PCT/CN2023/072764, International Filing Date Jan. 18, 2023, 8 pages.

(Continued)

*Primary Examiner* — Katherine Lin
(74) *Attorney, Agent, or Firm* — Edward J. Wixted, III

(57) ABSTRACT

Disclosed are techniques for automatically determining whether a new disruption of service alert corresponds to a pattern of failures and automatically applying remedies based on the determined pattern. Datasets of historical disruption of service alerts on networked computing clusters are used to train a machine learning algorithm to identify patterns between alerts. When a new disruption of service alert is received, historical disruption of service alerts for the originating networked computing cluster are also received and provided as input to the machine learning model. The machine learning model then automatically determines whether the new alert fits a pattern with the historical alerts from the same cluster, and when a fit is found, remedial actions are sourced from the alerts that fit the pattern to be applied automatically to the originating networked computing cluster.

19 Claims, 6 Drawing Sheets

(56) References Cited

U.S. PATENT DOCUMENTS

| | | | | |
|---|---|---|---|---|
| 11,188,411 | B1 | 11/2021 | Shen | |
| 2014/0310564 | A1 | 10/2014 | Mallige | |
| 2015/0081885 | A1 | 3/2015 | Thomas | |
| 2018/0173584 | A1 | 6/2018 | Eckstein | |
| 2019/0068622 | A1 | 2/2019 | Lin | |
| 2019/0155678 | A1 * | 5/2019 | Hsiong | G06F 11/0757 |
| 2019/0163594 | A1 * | 5/2019 | Hayden | G06F 11/3024 |
| 2020/0117531 | A1 | 4/2020 | Sudharsana | |
| 2021/0081842 | A1 * | 3/2021 | Polleri | G06F 16/24573 |

OTHER PUBLICATIONS

"Customize Business Outcomes with ZIF", Dec. 2, 2020, Downloaded from the Internet on Apr. 14, 2021, 13 pgs., <https://zif.ai/customize-business-outcomes-with-zif/>.

"Moogsoft Observability for DevOps and SREs", Solution Brief Moogsoft, 2020, 10 pgs., <https://www.moogsoft.com/wp-content/uploads/2020/10/Moogosft-Solution-Brief-100120.pdf>.

Chen, et al., "Failure Analysis of Jobs in Compute Clouds: A Google Cluster Case Study", 2014 IEEE 25th International Symposium on Software Reliability Engineering, 2014, 11 pgs., doi: 10.1109/ISSRE.2014.34.

Disclosed Anonymously, "Feedback-Based Automatic Anomaly Detection for Cloud Platforms", An IP.com Prior Art Database Technical Disclosure, IP.com No. IPCOM000260742D, Dec. 18, 2019, 4 pgs.

* cited by examiner

Figure 4:
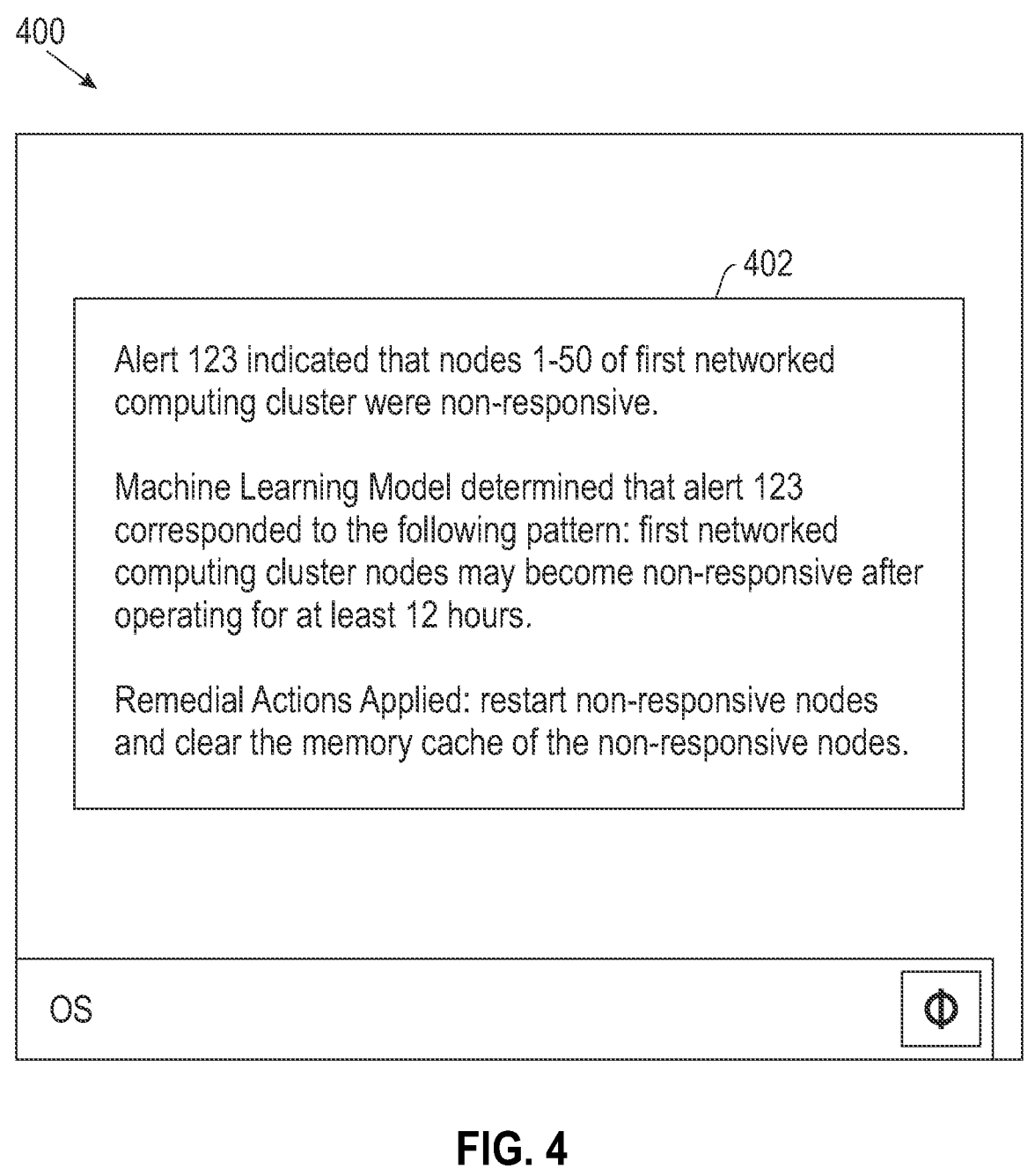

400

402

Alert 123 indicated that nodes 1-50 of first networked computing cluster were non-responsive.

Machine Learning Model determined that alert 123 corresponded to the following pattern: first networked computing cluster nodes may become non-responsive after operating for at least 12 hours.

Remedial Actions Applied: restart non-responsive nodes and clear the memory cache of the non-responsive nodes.

MACHINE LEARNING ASSISTED REMEDIATION OF NETWORKED COMPUTING FAILURE PATTERNS

BACKGROUND

The present invention relates generally to the field of information technology servicing, and more particularly to automating remediation processes for networked computing clusters.

DevOps (alternatively Devops or devops) is a group of practices which combines software development (Dev) and IT operations (Ops). One purpose of DevOps is to shorten the systems development life cycle and provide continuous delivery with high software quality. DevOps is complementary with the practices of Agile software development; some DevOps aspects came from the Agile methodology.

Machine learning (ML) is the study of computer algorithms which automatically improve through experience. It is typically viewed as a subset of artificial intelligence (AI). Machine learning algorithms typically construct a mathematical model based on sample data, sometimes known as "training data", in order to determine predictions or decisions without being specifically programmed to do so. Typically, machine learning models require a large quantity of data in order for them to perform well. Often, when training a machine learning model, one needs to collect a large, representative sample of data from a given training set. Data from the training set can be as varied as a corpus of text, a collection of images (or videos), and data collected from individual users of a service.

Cloud computing is the on-demand availability of computer system resources, especially data storage (cloud storage) and computing power, without direct active management by the user of the resources. The term is typically used to describe data centers available to many users over the Internet. Large clouds, which are predominant today, often have functions distributed over several locations from central servers. If the connection to the user is relatively close in geographic terms, it may be designated as an edge server. Clouds may be limited to a single organization or be available to multiple organizations, which may also be known as multitenant or multitenancy. Cloud computing relies on the sharing of resources to achieve coherence and enhanced value through economies of scale.

SUMMARY

According to an aspect of the present invention, there is a method, computer program product and/or system that performs the following operations (not necessarily in the following order): (i) receiving a set of historical disruption of service alerts and their corresponding solutions; (ii) generating a machine learning model for determining patterns for disruption of service alerts and their corresponding solutions; (iii) receiving a new disruption of service alert for a first networked computing cluster and a corresponding set of historical disruption of service events for the first networked computing cluster; (iv) determining whether the new disruption of service alert corresponds to a pattern of disruption of service events in the corresponding set of historical disruption of service events for the first networked computing cluster based, at least in part, on the machine learning model; (v) determining a set of automated remedial steps to remedy the new disruption of service alert based, at least in part, on the machine learning model; and (vi) automatically executing the set of automated remedial steps on the first networked computing cluster. Wherein services correspond to communication of data over a wide area network.

BRIEF DESCRIPTION OF THE DRAWINGS

FIG. 4 is a screenshot view generated by the first embodiment system;

DETAILED DESCRIPTION

Figure 1:
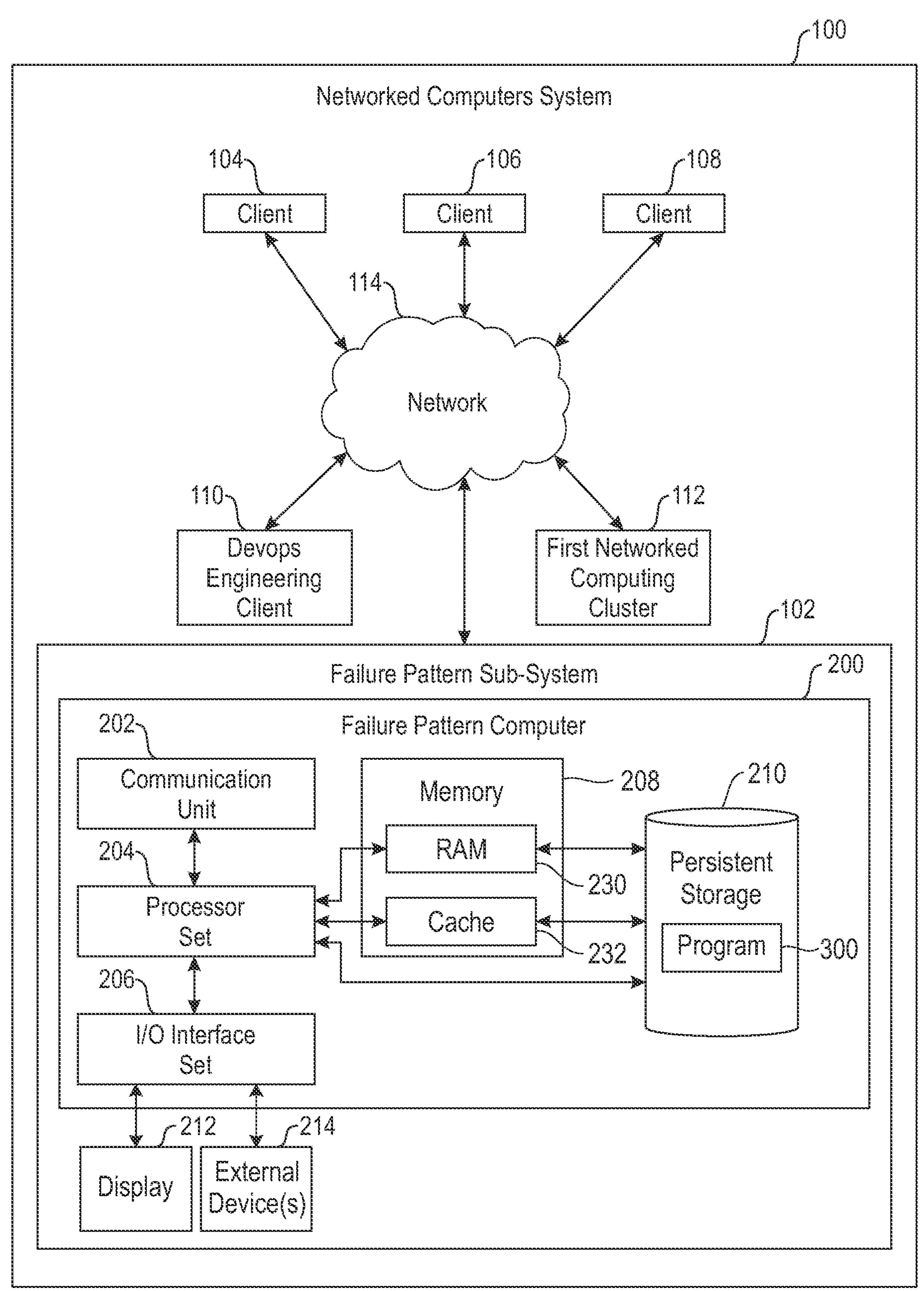
FIG. 1 is a block diagram view of a first embodiment of a system according to the present invention.

Some embodiments of the present invention are directed to techniques for automatically determining whether a new disruption of service alert corresponds to a pattern of failures and automatically applying remedies based on the determined pattern. Datasets of historical disruption of service alerts on networked computing clusters are used to train a machine learning algorithm to identify patterns between alerts. When a new disruption of service alert is received, historical disruption of service alerts for the originating networked computing cluster are also received and provided as input to the machine learning model. The machine learning model then automatically determines whether the new alert fits a pattern with the historical alerts from the same cluster, and when a fit is found, remedial actions are sourced from the alerts that fit the pattern to be applied automatically to the originating networked computing cluster.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium (sometimes referred to as "machine readable storage medium") can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Ribed in detail with reference to the Figures. Networked computers system 100 includes: server subsystem 102 (sometimes herein referred to, more simply, as subsystem 102); client subsystems 104, 106, 108; DevOps client 110; first networked computing cluster 112; and communication network 114. Server subsystem 102 includes: server computer 200; communication unit 202; processor set 204;

input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

DevOps engineering client 110 is a client computer associated with one or more DevOps engineers to perform DevOps engineering tasks for first networked computing cluster 112.

First networked computing cluster 112 is a networked computing cluster comprising 100 computers (or nodes) connected together to provide cloud computing capabilities, such as hosting and executing applications for remote clients.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
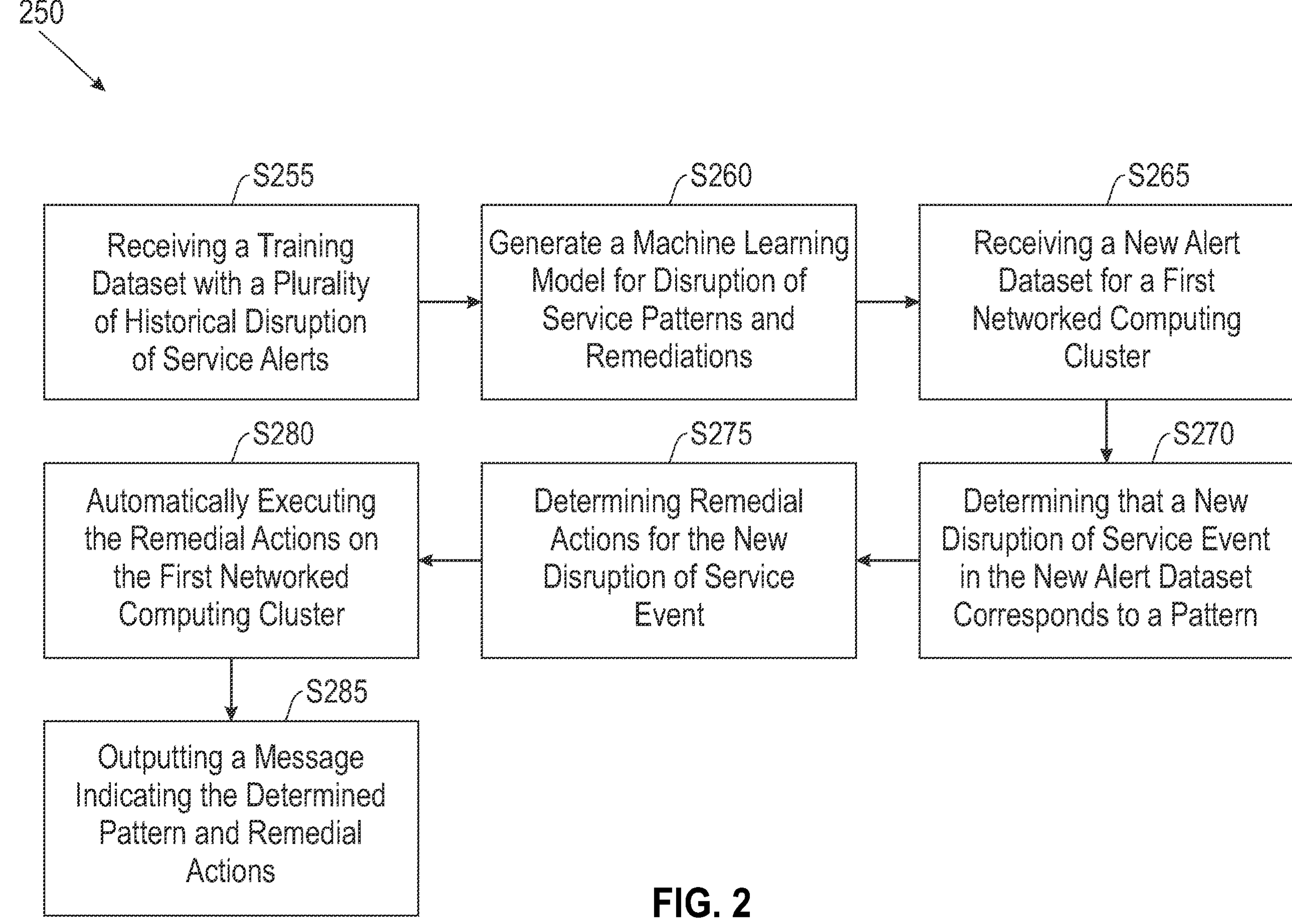
FIG. 2 is a flowchart showing a first embodiment method performed, at least in part, by the first embodiment system.
Figure 3:
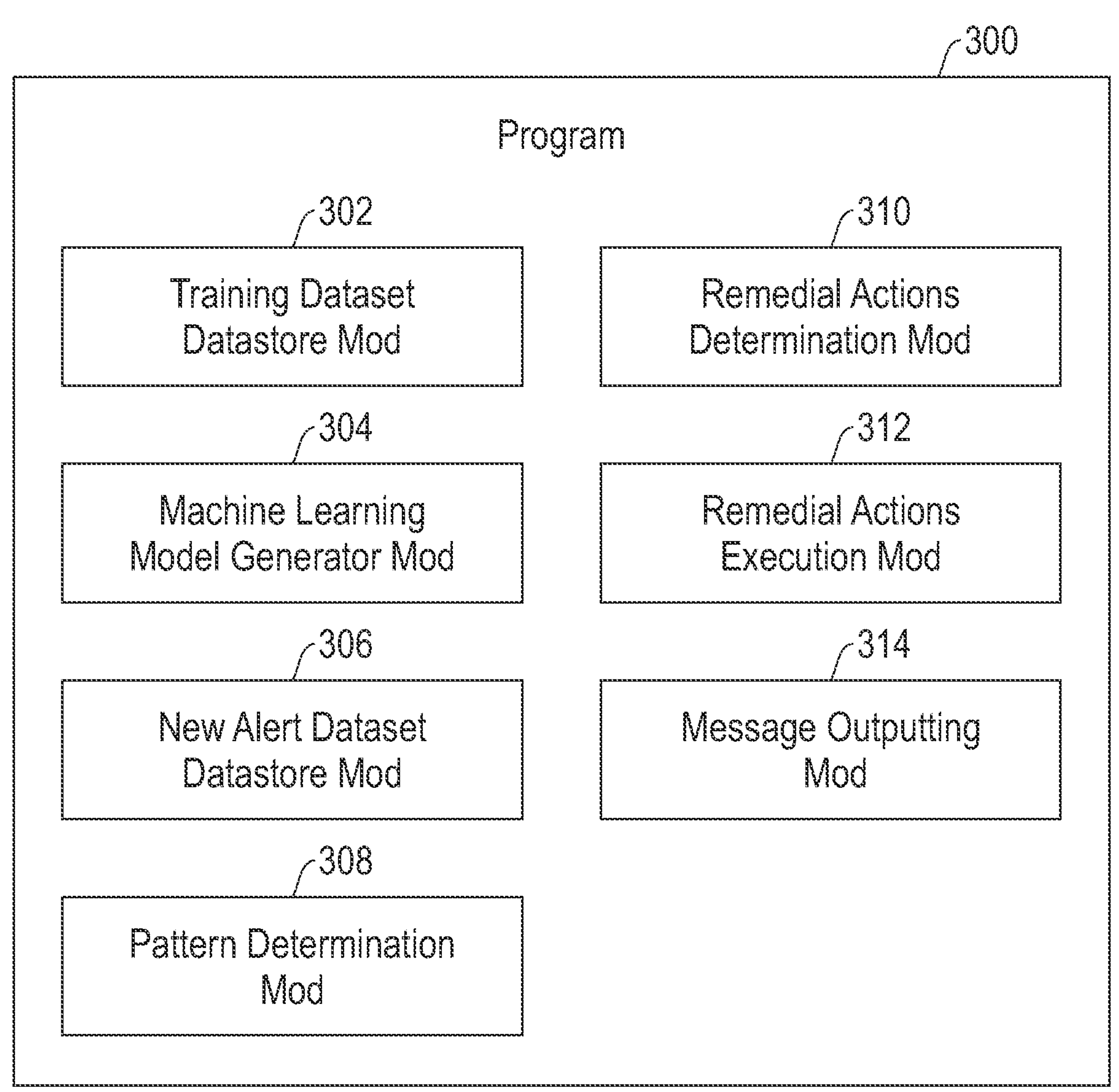
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation 5255, where training dataset datastore module ("mod") 302 receives a training dataset with a plurality of historical disruption of service alerts. In this simplified embodiment, the plurality of historical disruption of service alerts correspond to historical disruption of service events that occurred on a plurality of networked computing clusters. A networked computing cluster comprises a set of computers (or nodes) which are connected to perform as a single system, such as a cloud computing platform. Nodes within a cluster commonly have the same operating system and hardware specifications (such as using the same type of CPU, RAM modules, storage components, etc.). A disruption of service event is one where delivery of agreed upon technology resources (for example, cloud computing services, a software application, provision of computing devices, etc.) cannot be performed according to an agreed upon standard (such as standards stipulated in a service level agreement, or SLA, which states that a given application hosted in a cloud computing cluster to have a minimum bandwidth available at all times of 100000 application instances).

For example, the SLA for an application stipulates a given speed or bandwidth for the application on the cluster, where an application is to have at least 1000 instances available at any given time, but a service disruption event results in only 500 instances being available for one hour because half of the nodes in a cluster were inoperable for that hour. The cause of the nodes' inoperability can be from bugs in the software of the nodes, hardware issues in the nodes and/or computing cluster environment (such as faulty components in the nodes or disrupted power supply to the cluster), etc. When a disruption of service event occurs, typically there is a response from engineers supporting the cluster (for example, a DevOps team), where the engineers execute one or more tasks (or steps) on at least some of the nodes in the cluster to resume services within the expected operating thresholds. Included in the training dataset is the corresponding tasks performed to resolve a given disruption of service event.

Processing proceeds to operation S260, where machine learning model generator mod 304 generates a machine learning model for disruption of service patterns and remediations. In this simplified embodiment, the training dataset stored in training dataset datastore mod 302 is used to generate and train a machine learning model tasked with identifying patterns of disruption of service events and their corresponding remediations. The resulting machine learning model determines whether there is a pattern between an input new disruption of service event for a given networked computing cluster and at least some of an input set of historical disruption of service events for the given networked computing cluster. The resulting machine learning model also determines remedial steps to be applied to the given networked computing cluster from the remedial steps applied to the given networked computing cluster in the historical disruption of service events that are determined to be part of a pattern with the input new disruption of service event.

Processing proceeds to operation S265, where new alert datastore mod 306 receives a new alert dataset for a first networked computing cluster. In this simplified embodiment, the new alert corresponds to disruption of service event on first networked computing cluster 112 of FIG. 1, with context information indicating that half of the nodes in the first networking cluster (or fifty out of the one hundred of the nodes connected to the cluster) are not responding to commands, and all of the nodes in first networked computing cluster 112 have been operating for 14 hours continuously. Accompanying the new alert dataset is a corresponding alert response dataset for the first networked computing cluster with a set of historical disruption of service events for the first networked computing cluster, corresponding context information for each historical event (such as error codes, instructions executed prior to the event, pending instructions, software/firmware version numbers, hardware component temperatures, geographic locations of the nodes, etc.) and the corresponding remedial actions applied to the first networked computing cluster to resolve each disruption of service event. Among the set of historical disruption of service events is ten instances where half of the nodes of the first networked computing cluster become non-responsive. For three of those events, the nodes were non-responsive after application APP_1 received a new update and attempted to modify database database_1, and the remedial steps taken included updating the operating system for all one hundred nodes. For the remaining seven events, the disruption of service event occurs after the nodes have been operating for at least twelve hours continuously, the remedial steps included restarting the non-responsive nodes and clearing their memory caches.

Processing proceeds to operation S270, where pattern determination mod 308 determines that a new disruption of service event in the new alert dataset corresponds to a pattern. In this simplified embodiment, the machine learning model determines that the new disruption of service event stored in new alert dataset datastore mod 306 corresponds to a pattern with the seven historical disruption of service events of the set of historical disruption of service events for the first networked computing cluster. This determination was based on similarities between context information of the new disruption of service event that was inputted into the machine learning model (such as the 14 hours of continuous operation for the nodes in first networked computing cluster 112) and context information for the seven historical disruption of service events of the set of historical disruption of service events for the first networked computing cluster (such as the 12 or more hours of continuous operations for the nodes of first networked computing cluster 112). In some alternative embodiments, where pattern determination mod 308 instead determines that the new disruption of service alert does not correspond to a pattern with historical disruption of service alerts for the first networked computing cluster, instead of proceeding to S275, processing would instead proceed to determine which historical disruption of service alerts for the first networked computing cluster are most closely similar to the new disruption of service alert (for example, perhaps the three most similar historical disruption of service alerts). Instead of automatically applying a set of remedial actions as described below, remedial actions for the similar historical disruption of service alerts are communicated in a message to a computer device for selection by a user as sets of one or more remedial actions. Upon receive selection of a set of remedial actions, remedial actions execution mod 312 automatically applies those remedial actions to the target networked computing cluster. Afterwards, a message is communicated to the user indicating whether the remedial actions were successful, and the result is incorporated into the machine learning model to refine the model.

Processing proceeds to operation S275, where remedial actions determination mod 310 determines remedial actions for the new disruption of service event. In this simplified embodiment, the remedial actions are determined by the machine learning model from the remedial actions applied in the seven historical disruption of service events of the set of historical disruption of service events for the first networked computing cluster that are part of the pattern with the new disruption of service event stored in new alert dataset datastore mod 306. In the seven historical disruption of service events of the set of historical disruption of service events for the first networked computing cluster, the remedial actions includes: (i) restarting the non-responsive nodes; and (ii) clearing the memory cache of the non-responsive nodes. These remedial actions are determined to be applicable to the new disruption of service event stored in new alert dataset datastore mod 306.

Processing proceeds to operation S280, where remedial actions execution mod 312 automatically executes the remedial actions on the first networked computing cluster. In this simplified embodiment, remedial actions execution mod 312 applies the remedial actions determined at S275 upon first networked computing cluster 112, which include: (i) restarting the non-responsive nodes; and (ii) clearing the memory cache of the non-responsive nodes. Remedial actions execution mod 312 applies these remedial actions upon the nodes of networked computing cluster 112 automatically without any human intervention. In some alternative embodiments, the remedial actions are instead communicated to a computer associated with a DevOps engineer in the form of a message including recommendations for the remedial actions. In yet further alternative embodiments, the message includes several sets of remedial actions for selection by the recipient, which, when selected, are automatically applied upon the nodes of the networked computing cluster by remedial actions execution mod 312.

Processing proceeds to operation S285, where message outputting mod 314 outputs a message indicating the determined pattern and remedial actions. In this simplified embodiment, message 402 of screenshot 400 of FIG. 4 is outputted to DevOps engineering client 110, for review by a DevOps engineer.

III. Further Comments and/or Embodiments

Some embodiments of the present invention recognize the following facts, potential problems and/or potential areas for improvement with respect to the current state of the art: (i) in a cloud environment there would be typically thousands of host machines and applications spanning across several data centers; (ii) many times there are failures that just happened at that instant and cannot be reproduced when the developer tries to investigate them; (iii) these are mostly shelved as known, unsolved issues; (iv) typically, the cloud application support engineers receive alerts for disruption in cloud services applications; (v) often, the remediation of these alerts involve manual effort of the cloud engineer trying to debug and then executing the same repetitive pre-defined steps following a runbook to fix them; (v) there exists a need for an intelligent model that interprets the failure events and extracts useful parameters around the failed events and tries to correlate with similar incidents in the recent past; and (vi) it should also have suggestions for the possible reasons for the failure based on the patterns.

Some embodiments of the present invention recognize the following facts, potential problems and/or potential areas for improvement with respect to the current state of the art: (i) in one example is that there are more failures in a particular datacenter at one particular time slot of the day; (ii) in hindsight this could be because of some process that gets triggered at that point impacting the machines in the system; (iii) but because these incidents occur in isolation and different engineers debug it at different points in time, there is no 1000 ft level connecting of dots; (iv) in another example, in an instance where the failure occurs in the dependent services and the sub applications hangs or restarts for unexplained reasons; (v) in a complex multi-variable system with several sub systems, there could be trends and patterns for frequently occurring failures for different sets of configurations; (vi) for example, failure of MQ with some combination of RAM, CPU, failure of DB start for a particular setting of HA etc. that results in overall application failure; (vii) recording a snapshot of the system variables and configurations and finding then trending patterns in similar failures will be useful for the system engineer about the possible causes; (viii) in yet another example, it is common to see in cloud infrastructure for many hosts go to hung state or unresponsive state; (ix) this could be due to multiple reasons: (a) underlying host issues, (b) memory, (c) CPU, (d) networking issues, and (e) etc.; (x) its possible to have the list of events/patches and systemic metrics that are on these machines so that there could be a pattern derived out of it to see what exactly leads to this hung state and avoid or predict such states in advance; and (xi) this will avoid the support engineer to debug each failure or alert from scratch.

Some embodiments of the present invention may include one, or more, of the following operations, features, characteristics and/or advantages: (i) a well trained model which accurately identifies and analyzes the alerts for cloud support and automates the remedial process for the alert; (ii) in a typical cloud support scenario, engineers receive numerous alerts for disruption for cloud services; (iii) a cloud support engineer has to be available 24/7 to receive and attend to these alerts; (iv) some of these alerts can be capacity issues, data center issues, potential misuse of an application, etc.; (v) analyzes failures for a predefined period (1 month, 6 months etc.) on cloud clusters; (vi) derives a pattern for these failures by extracting correlated information about the failed clusters; (vii) sends an alert to the support engineers about the pattern in the repetitive failures; (viii) the model will also suggest possible fixes that could be applied for the alert based on the intelligence of the other alerts solved by the system; (ix) automates the corrective action for the alert; (x) sends out a report on the actions taken by the system; (xi) acts on the cloud engineers feedback for the support received and improvises the data model; and (xii) it should also suggest possible fixes for the issue from the intelligence of the past issues that were resolved through the system model.

Some embodiments of the present invention may include one, or more, of the following operations, features, characteristics and/or advantages: (i) intelligent analysis of the alerts; (ii) automatic remedial of steps without manual intervention; (iii) user feedback is recursive for better trained models; (iv) intelligently senses a problem and creates an alert; (v) finds trends and patterns based on historical alerts; (vi) an alert is generated for a cloud application; (vii) analyzes if this a known or a new alert; (viii) if this a known alert, then it starts a process to execute the remedial actions; (ix) if it is a new alert, it will understand and suggest the remedial steps based on previous analysis done by the model; (x) after the remedial actions are taken, a report is sent to the cloud support engineer; (xi) user feedback is flowed back in to the system; (xii) a ML model for analysis and classification of alerts (either KNN or Naive Bayes); and (xiii) a workflow engine is incorporated in the system such for delegation of tasks between engineer and the dev ops system.

Some embodiments of the present invention may include one, or more, of the following operations, features, characteristics and/or advantages: (i) analyzing failures for a predefined period (1 month, 6 months etc.) on cloud clusters; (ii) deriving a pattern for these failures by extracting correlated information about the failed clusters; (iii) sending an alert to the support engineers about the pattern in the repetitive failures; (iv) analyzes if this a known or a new alert; (v) if this is a known alert, then it starts a process to execute the remedial actions; (vi) automating the corrective action for the alert; (vii) if it is a new alert, it will understand and suggest the remedial steps based on previous analysis done by the model; (viii) after the remedial actions are taken, a report is sent to the cloud support engineer; (ix) user feedback is flowed back into the system; and (x) acting on the cloud engineers' feedback for the support received and improvises the data model.

Figure 5:
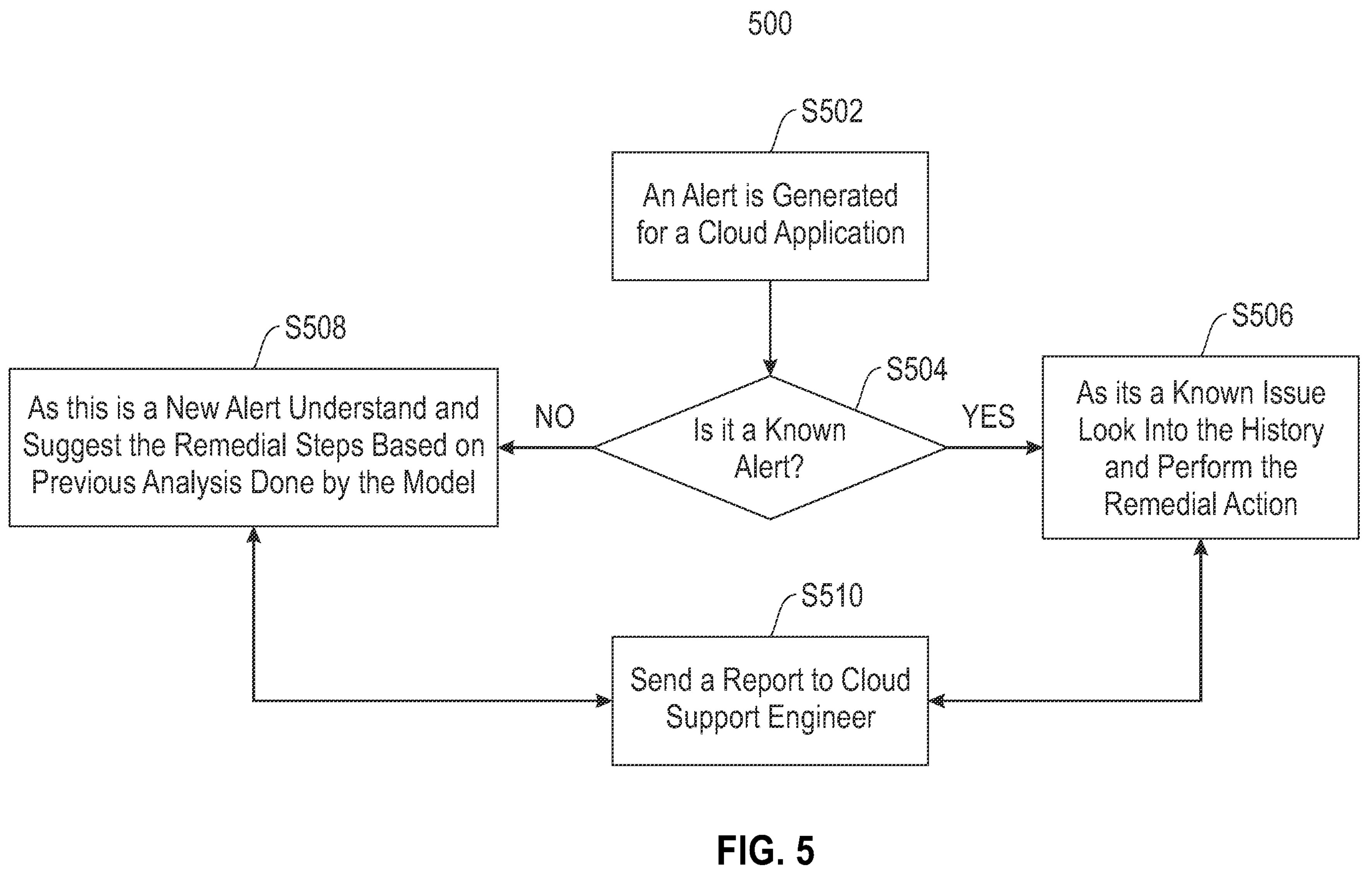
FIG. 5 is a flowchart showing a second embodiment method.

Flowchart 500 of FIG. 5 shows a second embodiment method according to the present invention, including: (i) step S502; (ii) decision block S504; (iii) step S506; (iv) step S508; and (v) step S510.

Figure 6:
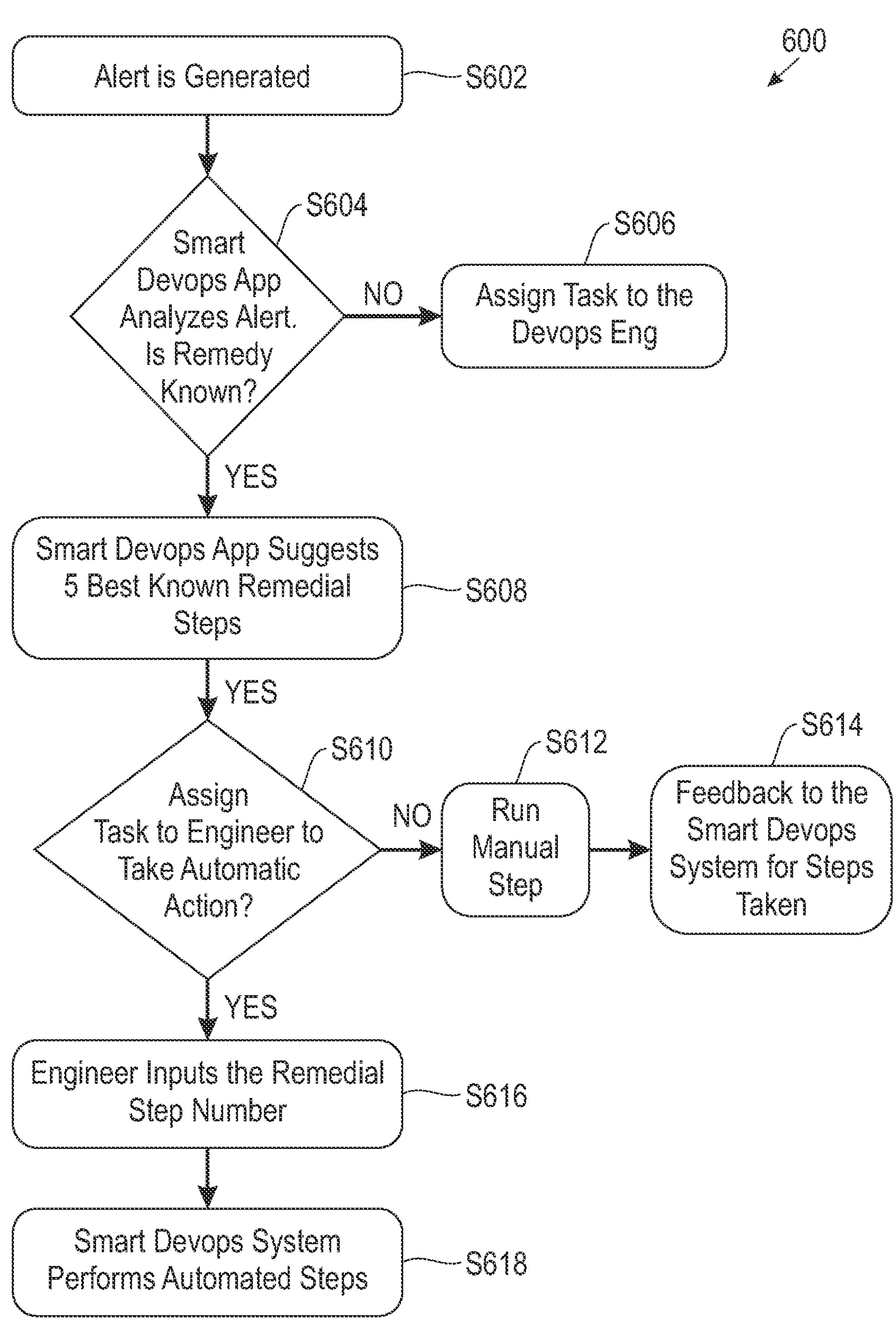
FIG. 6 is a flowchart showing a third embodiment method.

Flowchart 600 of FIG. 6 shows a third embodiment method according to the present invention, including: (i) step S602; (ii) decision block S604; (iii) step S606; (iv) step S608; (v) decision block S610; (vi) step S612; (vii) step S614; (viii) step S616; and (ix) step S618.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer implemented method (CIM) comprising:

receiving a set of historical disruption of service alerts and their corresponding solutions;

training a machine learning model for determining patterns for disruption of service alerts and their corresponding solutions;

receiving (i) a new disruption of service alert for a first networked computing cluster, (ii) a first set of context information of the new disruption of service, (iii) a corresponding set of historical disruption of service events for the first networked computing cluster, and (iv) a second set of context information corresponding to each of the set of historical disruption of service events, wherein the context information includes pending instructions;

determining whether the new disruption of service alert corresponds to a pattern of disruption of service events in the corresponding set of historical disruption of service events for the first networked computing cluster based, at least in part, on the machine learning model;

determining a set of automated remedial steps to remedy the new disruption of service alert based, at least in part, on the machine learning model; and automatically executing the set of automated remedial steps on the first networked computing cluster, wherein the set of automated remedial steps includes restarting one or more computers associated with the new disruption of service alert.

2. The CIM of claim 1, wherein networked computing clusters are cloud computing clusters.

3. The CIM of claim 1, further comprising:

responsive to determining that the new disruption of service alert corresponds to a pattern of disruption of service events, outputting an alert message to a computer device, wherein the message includes information indicative of the pattern; and responsive to determining the set of automated remedial steps to remedy the new disruption of service alert, outputting a message to the computer device, with the message including the set of automated remedial steps as one or more subsets of steps for selection by a user.

4. The CIM of claim 3, wherein automatically executing the set of automated remedial steps on the first networked computing cluster is responsive to receiving user input corresponding to a selection of the one or more subsets in the message, with the automatically executed set of automated remedial steps corresponding to the selected subset of steps selected by the user.

5. The CIM of claim 1, further comprising:

responsive to determining that the new disruption of service alert does not correspond to a pattern of disruption of service events, determining a set of similar disruption of service events from the corresponding set of historical disruption of service events for the first networked computing cluster based, at least in part, on the machine learning model;

wherein determining the set of automated remedial steps to remedy the new disruption of service alert includes determining one or more subsets of steps to remedy the new disruption of service alert based, at least in part, on the set of similar disruption of service events.

6. The CIM of claim 5, further comprising:

responsive to determining the set of automated remedial steps to remedy the new disruption of service alert, communicating a message to a computer device, with the message including the set of automated remedial steps as one or more subsets of steps for selection by a user, including information indicative of which similar disruption of service events correspond to the subsets of steps; and receiving user input corresponding to a selection of at least one subset of steps for automatic execution on the first networked computing cluster;

wherein automatically executing the set of automated remedial steps on the first networked computing cluster corresponds to automatically executing the selected at least one subset of steps on the first networked computing cluster.

7. A computer program product (CPP) comprising:

one or more computer-readable storage media; and program instructions stored on the one or more computer-readable storage media to perform operations comprising:

receiving a set of historical disruption of service alerts and their corresponding solutions;

training a machine learning model for determining patterns for disruption of service alerts and their corresponding solutions;

receiving (i) a new disruption of service alert for a first networked computing cluster, (ii) a first set of context information of the new disruption of service, (iii) a corresponding set of historical disruption of service events for the first networked computing cluster, and (iv) a second set of context information corresponding to each of the set of historical disruption of service events, wherein the context information includes pending instructions;

determining whether the new disruption of service alert corresponds to a pattern of disruption of service events in the corresponding set of historical disruption of service events for the first networked computing cluster based, at least in part, on the machine learning model;

determining a set of automated remedial steps to remedy the new disruption of service alert based, at least in part, on the machine learning model; and automatically executing the set of automated remedial steps on the first networked computing cluster, wherein the set of automated remedial steps includes restarting one or more computers associated with the new disruption of service alert.

8. The CPP of claim 7, wherein networked computing clusters are cloud computing clusters.

9. The CPP of claim 7, wherein the operations further comprise:

responsive to determining that the new disruption of service alert corresponds to a pattern of disruption of service events, outputting an alert message to a computer device, wherein the message includes information indicative of the pattern; and responsive to determining the set of automated remedial steps to remedy the new disruption of service alert, outputting a message to the computer device, with the message including the set of automated remedial steps as one or more subsets of steps for selection by a user.

10. The CPP of claim 9, wherein automatically executing the set of automated remedial steps on the first networked computing cluster is responsive to receiving user input corresponding to a selection of the one or more subsets in the message, with the automatically executed set of automated remedial steps corresponding to the selected subset of steps selected by the user.

11. The CPP of claim 7, wherein the operations further comprise:

responsive to determining that the new disruption of service alert does not correspond to a pattern of disruption of service events, determining a set of similar disruption of service events from the corresponding set of historical disruption of service events for the first networked computing cluster based, at least in part, on the machine learning model;

wherein determining the set of automated remedial steps to remedy the new disruption of service alert includes determining one or more subsets of steps to remedy the new disruption of service alert based, at least in part, on the set of similar disruption of service events.

12. The CPP of claim 11, wherein the operations further comprise:

responsive to determining the set of automated remedial steps to remedy the new disruption of service alert, communicating a message to a computer device, with the message including the set of automated remedial steps as one or more subsets of steps for selection by a user, including information indicative of which similar disruption of service events correspond to the subsets of steps; and receiving user input corresponding to a selection of at least one subset of steps for automatic execution on the first networked computing cluster;

wherein automatically executing the set of automated remedial steps on the first networked computing cluster corresponds to automatically executing the selected at least one subset of steps on the first networked computing cluster.

13. A computer system (CS) comprising:

a processor set;

one or more computer-readable storage media; and program instructions stored on the one or more computer-readable storage media to cause the processor set to perform operations comprising:

receiving a set of historical disruption of service alerts and their corresponding solutions;

training a machine learning model for determining patterns for disruption of service alerts and their corresponding solutions;

receiving (i) a new disruption of service alert for a first networked computing cluster, (ii) a first set of context information of the new disruption of service, (iii) a corresponding set of historical disruption of service events for the first networked computing cluster, and (iv) a second set of context information corresponding to each of the set of historical disruption of service events, wherein the context information includes pending instructions;

determining whether the new disruption of service alert corresponds to a pattern of disruption of service events in the corresponding set of historical disruption of service events for the first networked computing cluster based, at least in part, on the machine learning model;

determining a set of automated remedial steps to remedy the new disruption of service alert based, at least in part, on the machine learning model; and automatically executing the set of automated remedial steps on the first networked computing cluster, wherein the set of automated remedial steps includes restarting one or more computers associated with the new disruption of service alert.

14. The CS of claim 13, wherein networked computing clusters are cloud computing clusters.

15. The CS of claim 13, wherein the operations further comprise:

responsive to determining that the new disruption of service alert corresponds to a pattern of disruption of service events, outputting an alert message to a computer device, wherein the message includes information indicative of the pattern; and responsive to determining the set of automated remedial steps to remedy the new disruption of service alert, outputting a message to the computer device, with the message including the set of automated remedial steps as one or more subsets of steps for selection by a user.

16. The CS of claim 15, wherein automatically executing the set of automated remedial steps on the first networked computing cluster is responsive to receiving user input corresponding to a selection of the one or more subsets in the message, with the automatically executed set of automated remedial steps corresponding to the selected subset of steps selected by the user.

17. The CS of claim 13, wherein the operations further comprise:

responsive to determining that the new disruption of service alert does not correspond to a pattern of disruption of service events, determining a set of similar disruption of service events from the corresponding set of historical disruption of service events for the first networked computing cluster based, at least in part, on the machine learning model;

wherein determining the set of automated remedial steps to remedy the new disruption of service alert includes determining one or more subsets of steps to remedy the new disruption of service alert based, at least in part, on the set of similar disruption of service events.

18. The CS of claim 17, wherein the operations further comprise:

responsive to determining the set of automated remedial steps to remedy the new disruption of service alert, communicating a message to a computer device, with the message including the set of automated remedial steps as one or more subsets of steps for selection by a user, including information indicative of which similar disruption of service events correspond to the subsets of steps; and receiving user input corresponding to a selection of at least one subset of steps for automatic execution on the first networked computing cluster;

wherein automatically executing the set of automated remedial steps on the first networked computing cluster corresponds to automatically executing the selected at least one subset of steps on the first networked computing cluster.

19. The CIM of claim 1, wherein the set of automated remedial steps further comprise clearing a memory cache of non-responsive nodes.

* * * * *